United States Patent [19]

Smith et al.

[11] Patent Number: 4,493,497
[45] Date of Patent: Jan. 15, 1985

[54] PIPE CONNECTION ASSEMBLY

[76] Inventors: Bobby E. Smith, 126 Back St. East; Benjamin V. Smith, 130 Back St. East, both of Savannah, Ga. 31406

[21] Appl. No.: 275,579

[22] Filed: Jun. 22, 1981

[51] Int. Cl.³ .............................................. F16L 57/00
[52] U.S. Cl. ...................................... 285/13; 285/93; 285/356
[58] Field of Search ....... 285/351, 356, 348, DIG. 25, 285/12, 14, 13, 93

[56] References Cited

U.S. PATENT DOCUMENTS

| | | | |
|---|---|---|---|
| 311,506 | 2/1885 | Mayer | 285/356 X |
| 1,039,846 | 10/1912 | Thorndike | |
| 1,475,993 | 12/1923 | Harris et al. | 285/13 |
| 1,522,226 | 1/1925 | Bowles | 285/13 |
| 1,996,779 | 4/1935 | Wheller | |
| 2,126,857 | 8/1938 | Yancey | 285/356 X |
| 2,590,512 | 3/1952 | Crain | 285/348 X |
| 2,620,880 | 12/1952 | Mueller et al. | |
| 2,828,980 | 4/1958 | Craig et al. | 285/351 X |
| 3,130,552 | 4/1964 | Bodine, Jr. | |
| 3,799,585 | 3/1974 | Frost | |
| 4,302,033 | 11/1981 | Evans et al. | 285/14 |

FOREIGN PATENT DOCUMENTS 839143  5/1952  Fed. Rep. of Germany ...... 285/351

*Primary Examiner*—Thomas F. Callaghan
*Attorney, Agent, or Firm*—Geoffrey R. Myers

[57] ABSTRACT

A pipe connection assembly for connecting pipes transmitting a fluid as provided. A feature of this invention is the fact that it prevents any fluid escaping from the connection from traveling along the pipes and damaging any machinery that may be located along the pipes. The pipe connection assembly is comprised of first (or upper) and second (or lower) packing assemblies that radially surround the pipes. In certain embodiments, each of the packing assemblies is comprised of a top packing ring, a packing and a packing base ring, each packing being encased by the two complementary packing rings and the pipes when the packing assemblies are properly assembled. An opening is formed between the second top packing ring and the first packing base ring. The pipe assemblies are located with respect to the pipe interface such that any escaping fluid will contact the first packing assembly and the opening before contacting the second packing assembly. Thus, once the escaping fluid gets by the first packing assembly the escaping fluid must still get by the second packing assembly to flow along the pipes. Furthermore, when the fluid gets by the first packing assembly it is no longer under pressure which makes it easier for the second packing assembly to stop the escaping fluid. Also, once the escaping fluid enters the opening, it becomes visible to workmen in the area. This will serve as a warning signal to the workmen that the first packing assembly needs servicing.

2 Claims, 4 Drawing Figures

PIPE CONNECTION ASSEMBLY

This invention relates to pipe connection assemblies connecting two pipes that transmit fluids. In particular, this invention relates to such pipe connection assemblies wherein any fluid escaping from the pipe connection is prevented from flowing along the pipes.

BACKGROUND OF THE INVENTION

There are many situations in which a fluid is transmitted through a network of pipes. Often this fluid is transmitted under pressure. These pipes are, of course, not a unitary piece of pipe, but are comprised of many individual pipes connected together. These connections are usually under pressure from the fluid being transmitted by the pipes. To resist this pressure and to prevent the connections from leaking, the connections are surrounded by packing glands that usually include a ring of packing material pressed against the pipes. However, these packing glands are frequently improperly installed and even if the packing glands are properly installed, the packing material wears out over time. Frequently, when either of these events occur, the fluid escapes the connection and packing gland and either flows down the pipes if the pipes have a significant vertical direction or drips off the pipes if the pipes are primarily horizontal.

Often the pipes carrying the liquid under pressure lead into a gear box or other mechanical apparatus having moving parts. If the fluid that escaped the connection flows along the pipe, it may end up in the gear box or on the other mechanical apparatus. The fluid may be a corrosive, or a fluid which hardens over time (e.g. a mortar), such that the fluid damages the gear box and other mechanical apparatus that it contacts.

One particular piece of equipment which employs a pipe network and connection as described above is a vertical earth auger boring unit having a shaft running down the center of the auger for feeding grout into the hole dug by the boring unit. Thus, as the auger is removed, the grout is fed down the center of the auger filling the hole to form a pile. The boring unit is basically comprised of a gearbox having an elongated auger protruding downward therefrom. The boring unit is lifted by a crane above the spot where the hole is to be dug and is held in place by the crane during the digging of the hole. The auger is operated such that a vertical hole is dug. As the auger is removed from the hole by the crane, grout is fed down the center shaft of the auger under pressure. The grout fills up the hole and when hardened, forms a concrete pile.

To feed grout into the center shaft, a grout input pipe is provided which leads from a source of the grout to a vertical pipe in the gearbox. The connection of the input pipe with the vertical pipe usually occurs on the top of the gearbox. It is this type of connection, the connection of the grout input pipe to the vertical pipe which is a typical environment in which this invention is practiced. Currently, these connections are provided with a single packing gland to prevent grout from escaping the connection and flowing into the gearbox. If the packing glands now available for use with this type connection fail, the escaping grout gets by the packing glands and sometimes runs down along the pipes into the gearbox. When the grout hardens, the gears within the gearbox are usually ruined.

The operator of the equipment as described above does not have any warning that the packing gland is failing since the grout is not in his view before it gets into the gearbox. Thus, the first signal to the operator that something is wrong is when the machine breaks down due to grout on the gears.

From the above, it is apparent that there exists a need in the art for a connection assembly, for connecting two pipes transmitting fluid, designed such that grout escaping past a packing gland of the connection assembly is prevented by other components of the connection assembly from flowing along the pipe, and which provides a warning signal to the operator of the equipment embodying the connection assembly that the packing gland has failed. It is the purpose of this invention to fulfill this need and other needs in the art apparent to the skilled artisan based on the following disclosure:

SUMMARY OF THE INVENTION

Generally this invention provides a pipe connection assembly for connecting pipes transmitting a fluid comprising: a first packing assembly including a first packing and first means for encasing said first packing against said pipes, a second packing assembly including a second packing and second means for encasing said second packing against said pipes, wherein said second packing assembly is spaced along said pipes from the first packing assembly such that there is an opening along said pipes between a portion of said first means and a portion of said second means, said first and said second packing assemblies being located with respect to the pipe connection such that any fluid escaping from the connection would first contact the first packing assembly and said opening before contacting the second packing assembly.

In some embodiments of this invention the first and second means are each comprised of a top packing ring, a packing and a packing base ring (though not necessarily of the same shape or size). The packing base ring of the second means has raised portions extending from the top thereof. The raised portions start at the exterior periphery of the packing base ring and extend inward a distance shorter than the radial width of the packing base ring. The top packing ring of the second means is attached to the inner non-raised portions of the packing base ring of the second means and is located within and below the top of the raised portions when the pipe connection assembly is properly assembled. The packing base ring of the first means is attached to the top of the raised portions of the packing base ring of the second means, thus, forming an opening along the pipes between the packing base ring of the first means and the top packing ring of the second means.

This invention can be added to an existing pipe connection assembly already including the first packing assembly by removing said first packing assembly, extending the pipe, placing said second packing assembly where said first packing assembly had been, and then attaching said first packing assembly to said second packing assembly.

The pipe connection assemblies for transmitting fluids under pressure according to this invention will prevent any fluid escaping from the first packing assembly from flowing along the pipe and damaging any equipment located along the pipe. This invention also provides a warning signal to inform the workers using equipment embodying this invention that the fluid is escaping from the first packing assembly. Furthermore, the connection assemblies according to this invention provides for a release of the pressure once the escaping fluid escapes through portions of the connection assemblies.

Certain embodiments of this invention will now be described with respect to the drawings wherein:

IN THE DRAWINGS

DETAILED DESCRIPTION OF THE INVENTION

Figure 1:
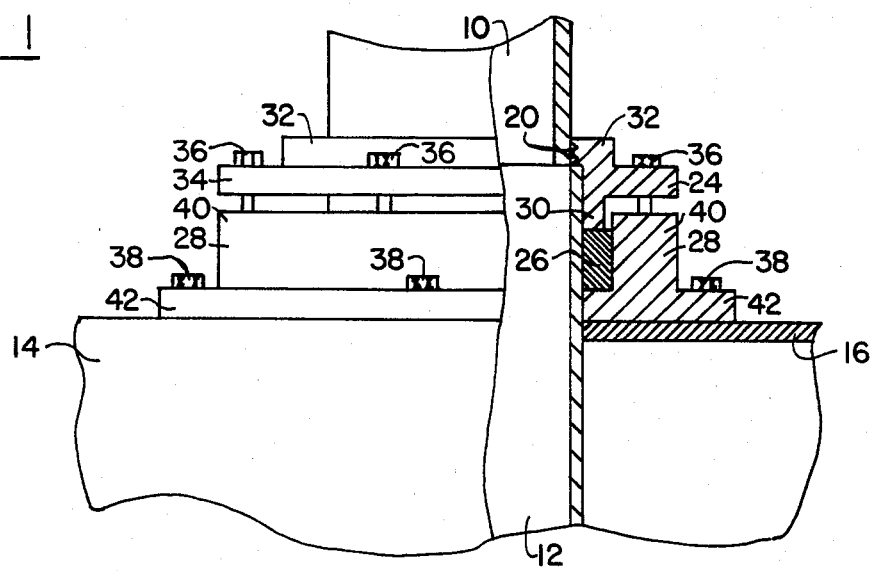
FIG. 1 is a side view, partially sectionalized, of a typical existing pipe connection assembly which can be converted to an embodiment of this invention.
Figure 2:
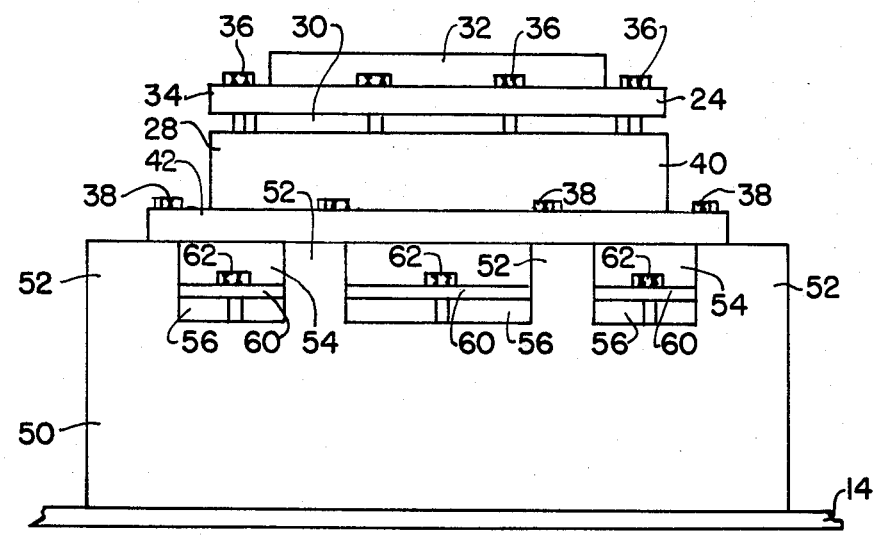
FIG. 2 is a side view of the embodiment of this invention to which the pipe connection assembly illustrated in FIG. 1 can be converted.
Figure 3:
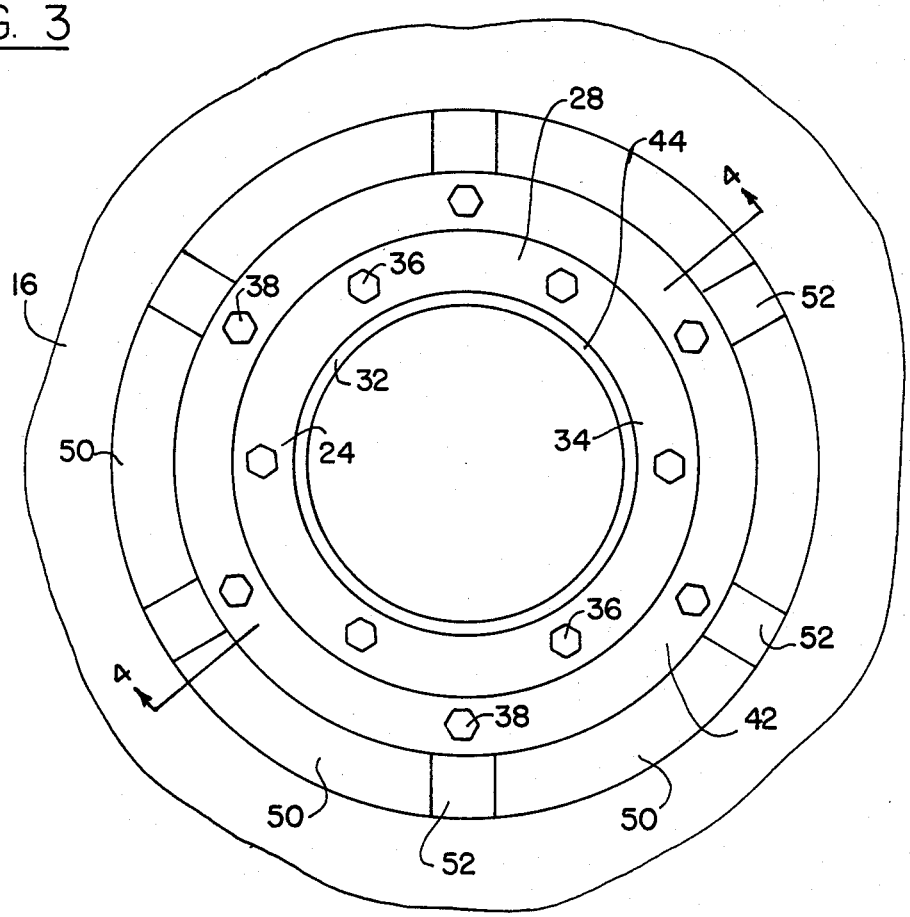
FIG. 3 is a top view of the embodiment of this invention illustrated in FIG. 2.

Referring to the Figures, and in particular FIG. 1, a typical pipe connection assembly for pipes transmitting fluids under pressure which can be converted into an embodiment of this invention greatly improve the pipe connection assembly is illustrated. The pipe connection assembly consists of inlet pipe 10 connected to a housing such as gearbox housing 14. Gearbox housing 14 has a top plate 16 to which the pipe connection assembly is attached. Extending up through top plate 16 is vertical pipe 12 which abuts inlet pipe 10 at the end thereof.

This pipe connection assembly includes packing base ring 28, primary packing 26 and top packing ring 24. All of these elements are shaped like rings and have an interior diameter that is slightly larger than the exterior diameter of pipe 12 so that these elements can be snugly placed around pipe 12.

Packing base ring 28 has two main portions, a bottom plate 42 and an upright flange 40. Bottom plate 42 abuts top plate 16 and is fastened thereto by bolts 38. Primary packing 26 is placed on bottom plate 42 between upright flange 40 and pipe 12.

Top packing ring 24 is comprised of top ring 32, middle portion 34 and inner lip 30. Top packing ring 24 is placed on top of primary packing 26 and packing base ring 28 and middle portion 34 is attached to upright flange 40 of packing base ring 28 by bolts 36. By tightening bolts 36, packing 26 can be placed under pressure, increasing its effectiveness.

Figure 4:
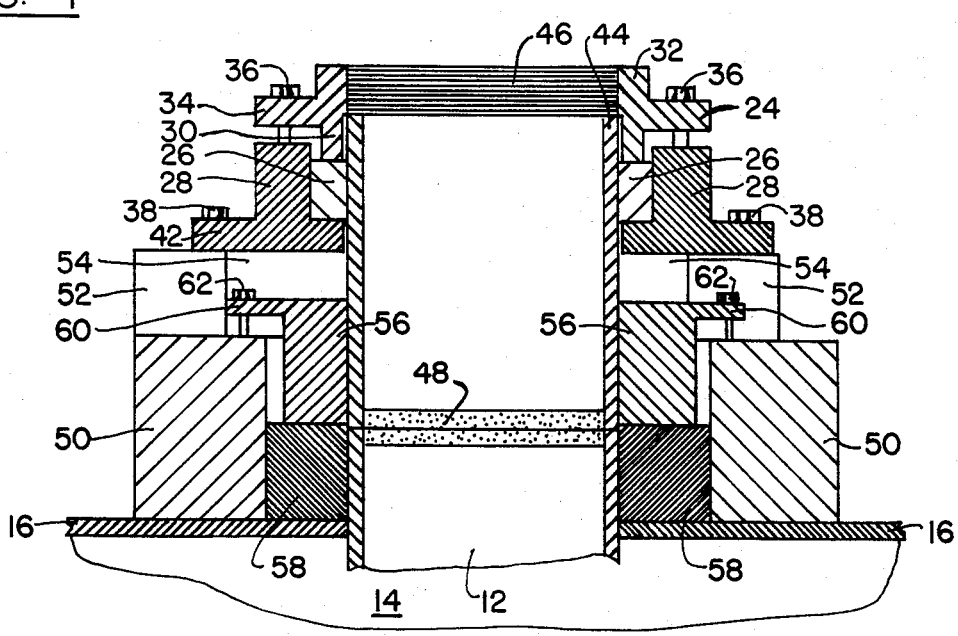
FIG. 4 is a sectionalized side view taken along line 4—4 of FIG. 3 of the embodiment of this invention illustrated in FIGS. 2 and 3.

Top ring 32 of top packing ring 24 has threads 46 on the inside thereof (see FIG. 4) which engage a mating threaded portion 20 on input pipe 10 to attach input pipe 10 to the pipe connection assembly.

One environment in which this connection assembly is currently employed is on some of the auger boring units used in constructing certain concrete piles. These auger units have a gearbox and an auger extending downward from the gearbox. The augers have a shaft running down the center thereof through which concrete can be fed. The concrete pile is constructed by boring a hole in the ground with the auger. As the auger is withdrawn from the hole, a grout is fed, under pressure, down the center shaft of the auger, filling the hole. To get the grout to the center shaft of the auger, it must be fed through the auger gearbox. The pipe connection assembly illustrated in FIG. 1 would be the connection between the grout inlet pipe 10 and the auger gearbox housing 14.

Unfortunately with this type of pipe connection assembly, which is common in the prior art, once the grout passes between primary packing 26 and pipe 12 (if packing 26 wears out or is improperly installed) the grout flows along pipe 12 into gearbox 14, damaging the gears therein.

This invention solves this problem by furnishing a second packing assembly which can be added to the original pipe connection assembly illustrated in FIG. 1 and described above. This new pipe assembly connection will prevent grout from entering gearbox 14 even if primary packing 26 fails. This second packing assembly includes supplemental base packing ring 50, supplemental packing 58 and supplemental top packing ring 56. All of these elements are ring-like in shape and have an interior diameter slightly larger than the exterior diameter of pipe 12 and pipe extension 44 (described below).

To employ this second packing assembly, the first packing assembly must be removed from the top of the gearbox housing 14. Then pipe 12 is extended by welding (shown by welding marks 48 on the pipes) pipe extension 44 to the top thereof. Next, supplemental packing base ring 50 is placed around pipe 12 and pipe extension 44, abutting top plate 16 and is attached thereto. Supplemental base packing ring 50 has raised portions 52 spaced equally on the top thereof. Raised portions 52 extend from the outer periphery of supplemental base packing ring 50 radially inward a distance short of the inner periphery of supplemental base packing ring 50.

Then, supplemental packing 58 is placed between supplemental base packing ring 50 and pipe 12 and pipe extension 44. Next, supplemental top packing ring 56, having flange 60, is placed on top of supplemental packing 58. Flange 60 is attached to the top non-raised portions of supplemental base packing ring 50 by bolts 62. When the connection assembly is so assembled, the outer periphery of top packing ring 56 is located within the inner periphery of raised portions 52 and the top of top packing ring 56 is below the top of raised portions 52. Bolts 62 can be tightened to exert pressure on packing 58.

Lastly, the original packing assembly is placed on raised portions 52 of supplemental base packing ring 50 and attached thereto by bolts 38. When the original packing assembly is so placed, windows 54 are formed framed by the individual raised portions 52 on the sides, the packing base ring 28 on the top and the supplemental packing base ring 50 on the bottom.

This configuration of elements eliminates the problem noted above prevalent in prior art devices, that being the leakage of grout into the gearbox housing. In this embodiment, when the grout gets by primary packing 26 along extension pipe 44, it will flow into a window 54 and contact the supplemental packing gland. This supplemental packing gland will prevent the escaping grout from further flowing along extension pipe 44. Thus, the escaping grout will tend to flow along the top of supplemental top packing ring 56 away from pipe extension 22 and not into gearbox housing 14. Also, once the escaping grout gets by primary packing 26 and into a window 54, the escaping grout is not under any pressure. This makes it easier for supplemental packing 58 to prevent the grout from passing into the gearbox housing.

Furthermore, once the grout has escaped into windows 54 the grout is in full view of the workers operating the machine. This acts as a warning signal to the workers that they should shut down the machine and put in new primary packing. Unlike the prior art connections, this warning will occur before any damage is done, greatly saving money and time due to a reduction in down time.

Once given the above disclosure, other embodiments, improvements and modifications will become known to the skilled artisan. These other embodiments, improvements and modifications are considered to be within the scope of this invention as defined by the following claims:

I claim:

1. A pipe connection assembly for connecting a grout input pipe with a second pipe which extends from and runs into a gearbox of a vertical auger boring unit that is used to drill holes to construct piles, said pipe connection assembly comprising:
   a first packing assembly including a first packing, a first top packing ring and a first packing base ring, said first packing being encased by and located between said first top packing ring, said first packing base ring and said second pipe,
   a second packing assembly including a second packing,
   a second top packing ring and a second packing base ring, said second packing being encased by and located between said second top packing ring, said second packing base ring and said second pipe,
   wherein said second packing assembly is spaced along said pipes from the first packing assembly such that there is an opening along said pipes between a portion of said first packing assembly and a portion of said second packing assembly,
   said first and said second packing assemblies being located with respect to the pipe connection such that any fluid escaping from the connection would first contact the first packing assembly and said opening before contacting the second packing assembly,
   said opening being between said first packing base ring and said second top packing ring,
   wherein the first and second packing assemblies are attached to each other,
   said second packing base ring has raised portions spaced along the top thereof, said first packing base ring being attached to said raised portions,
   said second top packing ring is attached to the top of the non-raised portions of said second packing base ring such that the top of said second top packing ring is below the top of said raised portions,
   said second packing base ring being attached to the housing of the gearbox.

2. A pipe connection assembly according to claim 1 wherein said opening is located such that said opening is visible to a person positioned adjacent said gearbox.

* * * * *